United States Patent
Dong et al.

(10) Patent No.: US 11,669,297 B2
(45) Date of Patent: Jun. 6, 2023

(54) AUDIO PLAYBACK CONTROL METHOD, AUDIO PLAYBACK CONTROL APPARATUS AND STORAGE MEDIUM

(71) Applicant: BEIJING XIAOMI MOBILE SOFTWARE CO., LTD., Beijing (CN)

(72) Inventors: Tingting Dong, Beijing (CN); Zheng Li, Beijing (CN); Xuan Ma, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/213,209

(22) Filed: Mar. 25, 2021

(65) Prior Publication Data
US 2021/0405961 A1 Dec. 30, 2021

(30) Foreign Application Priority Data
Jun. 30, 2020 (CN) .......................... 202010623975.5

(51) Int. Cl.
G06F 3/16 (2006.01)
H04W 4/80 (2018.01)
H04R 3/12 (2006.01)
H04R 5/04 (2006.01)

(52) U.S. Cl.
CPC ............... *G06F 3/165* (2013.01); *H04R 3/12* (2013.01); *H04R 5/04* (2013.01); *H04W 4/80* (2018.02)

(58) Field of Classification Search
None
See application file for complete search history.

(56) References Cited

U.S. PATENT DOCUMENTS

| | | | | |
|---|---|---|---|---|
| 2014/0376737 | A1* | 12/2014 | Goldman | .................. H04R 3/12 381/80 |
| 2018/0115844 | A1 | 4/2018 | Lu et al. | |
| 2018/0139071 | A1* | 5/2018 | Onohara | ............... H04L 12/282 |
| 2019/0020375 | A1 | 1/2019 | Oiwa et al. | |

FOREIGN PATENT DOCUMENTS

| | | |
|---|---|---|
| CN | 104025559 A | 9/2014 |
| CN | 104584522 A | 4/2015 |
| CN | 105679341 A | 6/2016 |

OTHER PUBLICATIONS

Extended European Search Report (EESR) in application No. EP 21165567.5 dated Aug. 25, 2021.

* cited by examiner

*Primary Examiner* — Hemant S Patel
(74) *Attorney, Agent, or Firm* — Syncoda LLC; Feng Ma

(57) ABSTRACT

A audio playback control method includes: triggering switching audio of media content played on a terminal to a first audio playback device for playback in response to a distance between the terminal and the first audio playback device reaching a communicable distance for near field communication during a process of playing the media content on the terminal; and switching the audio of the media content played on the first audio playback device to a second audio playback device for playback in response to the second audio playback device being triggered to play the media content during a process of playing the media content on the first audio playback device.

19 Claims, 6 Drawing Sheets

AUDIO PLAYBACK CONTROL METHOD, AUDIO PLAYBACK CONTROL APPARATUS AND STORAGE MEDIUM

CROSS-REFERENCE TO RELATED APPLICATION

This application claims priority to Chinese Patent Application No. 202010623975.5 filed on Jun. 30, 2020, the disclosure of which is hereby incorporated by reference in its entirety.

BACKGROUND

With the development of communication technology, more and more functions can be realized by terminals. For example, when a user has multiple terminals, the functions can be switched between multiple terminals. For example, music played on the terminal such as a mobile phone can be switched to other devices such as a speaker for playback, and music played on the speaker can also be switched back to the mobile phone.

SUMMARY

The present disclosure generally relates to the field of terminal technology, and more specifically, to an audio playback control method, an audio playback control apparatus, and a storage medium.

According to a first aspect of embodiments of the present disclosure, there is provided an audio playback control method, and the audio playback control method includes:

triggering switching audio of media content played on a terminal to a first audio playback device for playback in response to a distance between the terminal and the first audio playback device reaching a communicable distance for near field communication during a process of playing the media content on the terminal; and switching the audio of the media content played on the first audio playback device to a second audio playback device for playback in response to the second audio playback device being triggered to play the media content during a process of playing the media content on the first audio playback device.

In some embodiments, the second audio playback device is the terminal; and the second audio playback device being triggered to play the media content includes:

the distance between the terminal and the first audio playback device reaching the communicable distance for near field communication.

In some embodiments, the second audio playback device is another audio playback device different from the terminal and the first audio playback device; and the second audio playback device being triggered to play the media content includes:

a distance between the terminal and/or the first audio playback device and the another audio playback device reaching the communicable distance for near field communication.

In some embodiments, the switching the audio of the media content played on the first audio playback device to the second audio playback device for playback includes:

stopping playing the media content by the first audio playback device by controlling, and determining a playback interruption point; and playing the media content from the playback interruption point.

In some embodiments, for the case that the distance between the terminal and the another audio playback device reaches the communicable distance for near field communication, the switching the audio of the media content played on the first audio playback device to the second audio playback device for playback includes:

establishing a wireless connection with the second audio playback device; determining a current playback point of the media content played by the first audio playback device; and playing the media content from the current playback point by the second audio playback device by controlling.

In some embodiments, for the case that the distance between the first audio playback device and the another audio playback device reaches the communicable distance for near field communication, the switching the audio of the media content played on the first audio playback device to the second audio playback device for playback includes:

receiving a playback switching request sent by the first audio playback device and/or the second audio playback device; establishing a wireless connection with the second audio playback device; determining a current playback point of the media content played by the first audio playback device; and playing the media content from the current playback point by the second audio playback device by controlling.

In some embodiments, the method further includes:

stopping playing the media content by the first audio playback device by controlling; and/or disconnecting the wireless connection with the first audio playback device, wherein the wireless connection is used to transmit the media content with the first audio playback device.

In some embodiments, the second audio playback device is another audio playback device different from the terminal and the first audio playback device; and the second audio playback device being triggered to play the media content includes:

a distance between the second audio playback device and the terminal being less than the distance between the first audio playback device and the terminal.

According to a second aspect of embodiments of the present disclosure, there is provided an audio playback control method, and the audio playback control method includes:

triggering playing continuously media content played on a terminal in response to a distance between a first audio playback device and the terminal reaching a communicable distance for near field communication during a process of playing the media content on the terminal; and stopping playing the media content in response to a second audio playback device being triggered to play the media content during a process of playing the media content on the first audio playback device.

In some embodiments, the stopping playing the media content in response to the second audio playback device being triggered to play the media content during the process of playing the media content on the first audio playback device includes:

stopping playing the media content in response to a distance between the first audio playback device and the second audio playback device reaching the communicable distance for near field communication during the process of playing the media content on the first audio playback device.

In some embodiments, in response to the second audio playback device being another audio playback device different from the terminal and the first audio playback device, the method further includes:

sending a playback switching request to the terminal.

According to a third aspect of embodiments of the present disclosure, there is provided an audio playback control method, and the audio playback control method includes:

triggering playing continuously media content played on a first audio playback device in response to a distance between a second audio playback device and a terminal reaching a communicable distance for near field communication or a distance between the second audio playback device and the first audio playback device reaching the communicable distance for near field communication during a process of playing the audio of the media content on the first audio playback device.

According to a fourth aspect of embodiments of the present disclosure, there is provided an audio playback control apparatus, and the audio playback control apparatus includes:

a first switching module, configured to trigger to switch audio of media content played on a terminal to a first audio playback device for playback in response to a distance between the terminal and the first audio playback device reaching a communicable distance for near field communication during a process of playing the media content on the terminal; and a second switching module, configured to switch the audio of the media content played on the first audio playback device to a second audio playback device for playback in response to the second audio playback device being triggered to play the media content during a process of playing the media content on the first audio playback device.

In some embodiments, the second audio playback device is the terminal; and the second audio playback device being triggered to play the media content includes: the distance between the terminal and the first audio playback device reaching the communicable distance for near field communication.

In some embodiments, the second audio playback device is another audio playback device different from the terminal and the first audio playback device; and the second audio playback device being triggered to play the media content includes: a distance between the terminal and/or the first audio playback device and the another audio playback device reaching the communicable distance for near field communication.

In some embodiments, the second switching module is configured to: control the first audio playback device to stop playing the media content, and determine a playback interruption point; and play the media content from the playback interruption point.

In some embodiments, for the case that the distance between the terminal and the another audio playback device reaches the communicable distance for near field communication, the second switching module is configured to:

establish a wireless connection with the second audio playback device;

determine a current playback point of the media content played by the first audio playback device; and control the second audio playback device to play the media content from the current playback point.

In some embodiments, for the case in which the distance between the first audio playback device and the another audio playback device reaches the communicable distance for near field communication, the second switching module is configured to:

receive a playback switching request sent by the first audio playback device and/or the second audio playback device; establish a wireless connection with the second audio playback device; determine a current playback point of the media content played by the first audio playback device; and control the second audio playback device to play the media content from the current playback point.

In some embodiments, the first switching module is further configured to: control the first audio playback device to stop playing the media content; and/or disconnect the wireless connection with the first audio playback device, wherein the wireless connection is used to transmit the media content with the first audio playback device.

In some embodiments, the second audio playback device is another audio playback device different from the terminal and the first audio playback device; and the second audio playback device being triggered to play the media content includes: a distance between the second audio playback device and terminal being less than the distance between the first audio playback device and the terminal.

According to a fifth aspect of embodiments of the present disclosure, there is provided an audio playback control apparatus, and the audio playback control apparatus includes:

a communication module, configured to trigger continuous playback of media content played on a terminal in response to a distance between a first audio playback device and the terminal reaching a communicable distance for near field communication during a process of playing the media content on the terminal; and a control module, configured to stop playing the media content in response to a second audio playback device being triggered to play the media content during a process of playing the media content on the first audio playback device.

In some embodiments, the control module is configured to: stop playing the media content in response to a distance between the first audio playback device and the second audio playback device reaching the communicable distance for near field communication during the process of playing the media content on the first audio playback device.

In some embodiments, the communication module is further configured to: send a playback switching request to the terminal.

According to a sixth aspect of embodiments of the present disclosure, there is provided an audio playback control apparatus, and the audio playback control apparatus includes:

a communication module, configured to trigger continuous playback of media content played on a first audio playback device in response to a distance between a second audio playback device and a terminal reaching a communicable distance for near field communication or a distance between the second audio playback device and the first audio playback device reaching the communicable distance for near field communication during a process of playing the media content on the first audio playback device.

According to a seventh aspect of embodiments of the present disclosure, there is provided an audio playback control apparatus, comprising:

a processor; and memory for storing processor-executable instructions, wherein the processor is configured to execute the audio playback control method according to the first aspect or any one of the implementations of the first aspect.

According to an eighth aspect of embodiments of the present disclosure, there is provided an audio playback control apparatus, comprising:

a processor; and memory for storing processor-executable instructions, wherein the processor is configured to execute the audio playback control method according to the second aspect or any one of the implementations of the second aspect.

According to a ninth aspect of embodiments of the present disclosure, there is provided an audio playback control apparatus, comprising:

a processor; and memory for storing processor-executable instructions, wherein the processor is configured to execute the audio playback control method according to the third aspect.

According to a tenth aspect of embodiments of the present disclosure, there is provided a non-transitory computer-readable storage medium, wherein when instructions in the storage medium are executed by a processor of a mobile terminal, the mobile terminal is enabled to execute the audio playback control method according to the first aspect or any one of the implementations of the first aspect.

According to an eleventh aspect of embodiments of the present disclosure, there is provided a non-transitory computer-readable storage medium, wherein when instructions in the storage medium are executed by a processor of a mobile terminal, the mobile terminal is enabled to execute the audio playback control method according to the second aspect or any one of the implementations of the second aspect.

According to a twelfth aspect of embodiments of the present disclosure, there is provided a non-transitory computer-readable storage medium, wherein when instructions in the storage medium are executed by a processor of a mobile terminal, the mobile terminal is enabled to execute the audio playback control method according to the third aspect.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this disclosure, illustrate embodiments consistent with the present disclosure and, together with the description, serve to explain the principles of the present disclosure.

DETAILED DESCRIPTION

Figure 1:
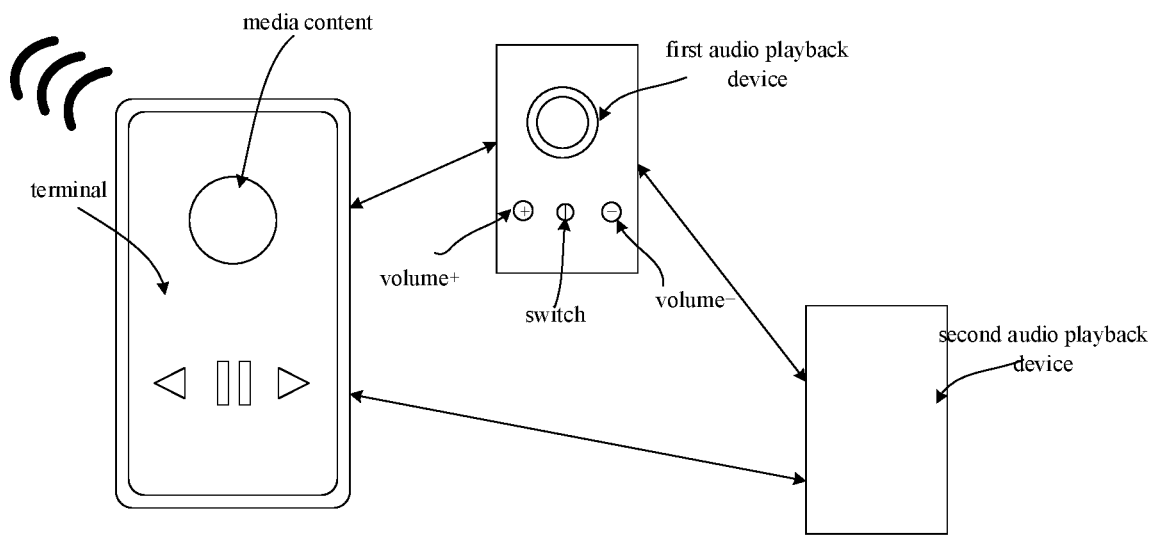
FIG. 1 is a schematic diagram illustrating an application environment of an audio playback control method according to some embodiments.

Description will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

With the progress and development of science and technology, technologies such as microprocessor, sensor technology, and network communication technology are gradually introduced into household appliances to form smart household appliances. A smart home is composed of various smart home appliances and network communications, and the smart home is controlled through the user's terminal.

Based on existing household appliances, one or more of the wireless communication functions such as Bluetooth, near field communication (NFC), Ultra-Wideband wireless technology (UWB), and Wi-Fi are added in an audio device such as a speaker, such that the sound equipment can realize functions such as communication and data transmission with the terminal, or other functions such as wireless communication or data transmission with other devices equipped with wireless communication functions such as Bluetooth, NFC, UWB, and Wi-Fi. Similarly, adding one or more of the wireless communication functions such as Bluetooth, NFC, UWB, and Wi-Fi to another audio playback device such as a TV or other playback device, can also realize the communication between devices with wireless communication functions, or the communication with the terminal.

In related technologies, during the process of playing the audio on the terminal, operations need to be made on the terminal to implement switching, disconnecting and other operations of the terminal and the audio playback device, the operations are tedious, and the playback device is limited to the audio relay playback between the terminal and the audio playback device.

Therefore, the present disclosure provides an audio playback control method to implement audio relay playback between the terminal and the audio playback device, and between the audio playback device and the audio playback device. Herein, it should be understood that the audio playback device that can communicate is provided with at least near field communication devices (such as NFC, UWB, etc.), and is also provided with one or more of the wireless communication functions such as Bluetooth, Wi-Fi and the like. Further, in some embodiments of the present disclosure, for ease of description, an audio playback device in close contact with the terminal is referred to as a first audio playback device, and a device in close contact with the first audio playback device is referred to as a second audio playback device. The following embodiments all use the first audio playback device and the second audio playback device to describe the audio playback control method provided by the present disclosure.

FIG. 1 is a schematic diagram illustrating an application environment of an audio playback control method according to some embodiments. As shown in FIG. 1, based on the audio playback control method provided by the present disclosure, the terminal is in close contact with the first audio playback device, and the first audio playback device relays and plays the media content of the terminal. Alternatively, the second audio playback device is in close contact with the first audio playback device and/or the terminal, and the second audio playback device relays and plays the media content of the terminal. The audio playback control method provided by the present disclosure is simple to operate and can realize mutual relay playback between multiple audio playback devices.

In various embodiments of the present disclosure, the "close contact" does not necessarily mean a physical contact. Rather, the phrase "close contact" can indicate communications, connections, or coupling within a certain distance to allow the communications.

The audio playback control method provided by various embodiments of the present disclosure will be described below with reference to the accompanying drawings and corresponding embodiments.

Figure 2:
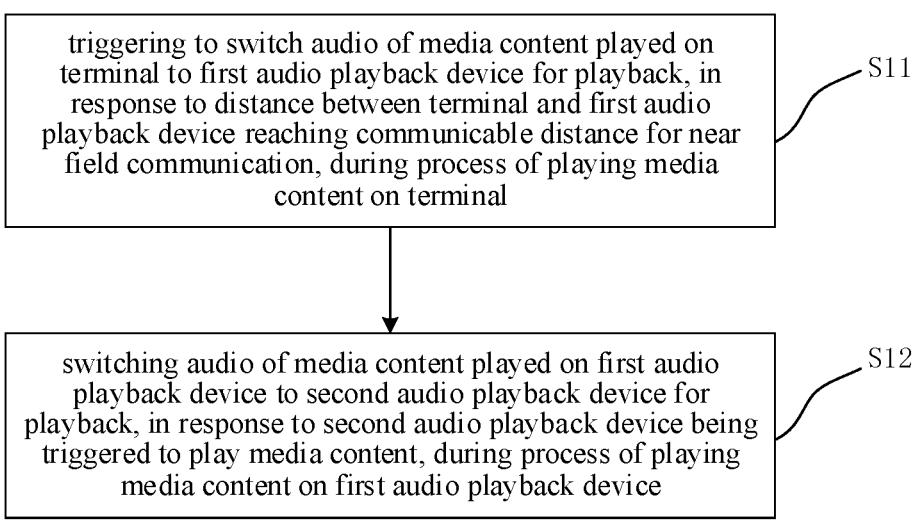
FIG. 2 is a flowchart illustrating an audio playback control method according to some embodiments.

FIG. 2 is a flowchart illustrating an audio playback control method according to some embodiments. As shown in FIG. 2, the audio playback control method is used in the terminal and includes the following steps.

In step S11, it is triggered to switch audio of media content played on a terminal to a first audio playback device for playback in response to a distance between the terminal and the first audio playback device reaching a communicable distance for near field communication during a process of playing the media content on the terminal.

In some embodiments of the present disclosure, there is a communicable distance between the terminal and the near field communication device provided in the audio playback device, for example, when the near field communication device is NFC, according to the characteristics of NFC itself, the communicable distance may be 10 centimeters, and when the near field communication device is UWB, the communicable distance can be a previously set distance, or can be set to 10 centimeters for an example.

When the distance between the terminal and the audio playback device is less than or equal to the communicable distance for near field communication, the near field communication is realized. In other words, for NFC, when the ranges of the radio frequencies emitted by the induction chips which realize the near field communication function in the terminal and the audio playback device can be sensed with each other, the near field communication between the terminal and the audio playback device can be realized; and for UWB, when a communication port determines that the distance from another communication port reaches the predetermined communication distance, the near field communication between the terminal and the audio playback device can be realized.

Figure 3:
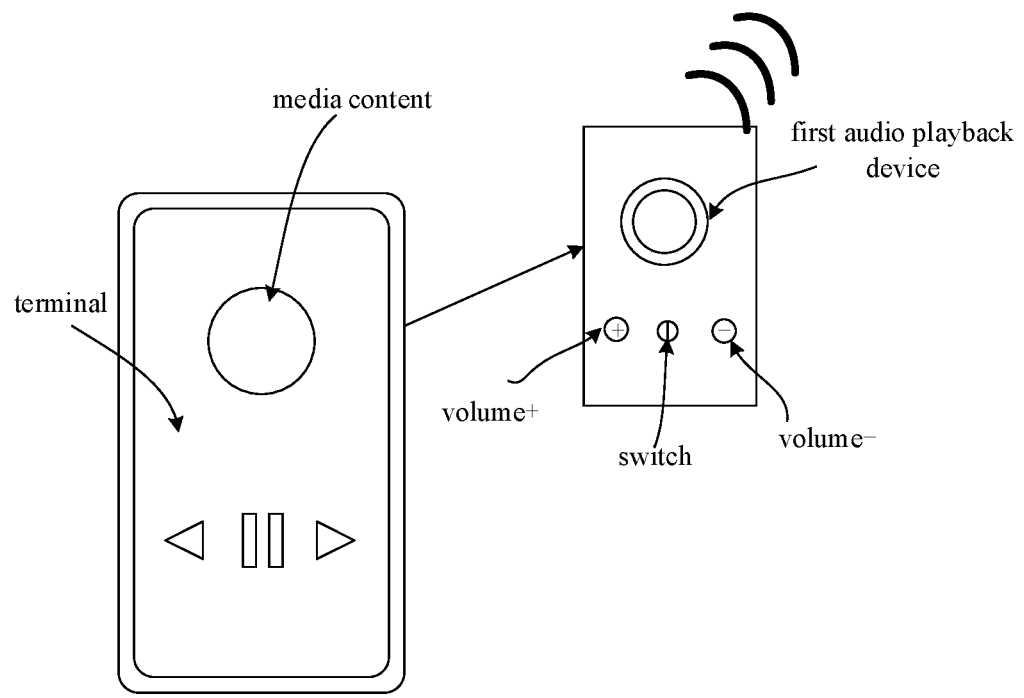
FIG. 3 is a schematic diagram illustrating an audio playback device switching process of an audio playback control method according to some embodiments.

FIG. 3 is a schematic diagram illustrating an audio playback device switching process of an audio playback control method according to some embodiments. As shown in FIG. 3, when the terminal is currently playing the media content and is close to the first audio playback device to the communicable distance during the playback process (the arrow direction in FIG. 3 indicates that the terminal is close to the communicable distance), it triggers a switch of audio of the media content played on the terminal to the first audio playback device for playback. For example, the terminal stores the media playback content and triggers a playback device switching instruction. The terminal controls the application that is currently playing the media content to stop playing the media content currently played, and sends the media content currently played to the first audio device, and the first audio device continues to relay and play the current media content. Herein, when the terminal sends the media content to the first audio device, the media content can be sent based on wireless communication transmission methods such as Bluetooth and Wi-Fi.

Herein, it can be understood that the switch of media content in some embodiments of the present disclosure may be a switch of all media content, or may be a switch of the audio of the media content. In some embodiments of the present disclosure, the media content and the audio of the media content are sometimes used interchangeably, but the meaning should be understood and should include the switch of all media content or the switch of the audio of the media content.

In step S12, the audio of the media content played on the first audio playback device is switched to a second audio playback device for playback in response to the second audio playback device being triggered to play the media content during a process of playing the media content on the first audio playback device.

Figure 4:
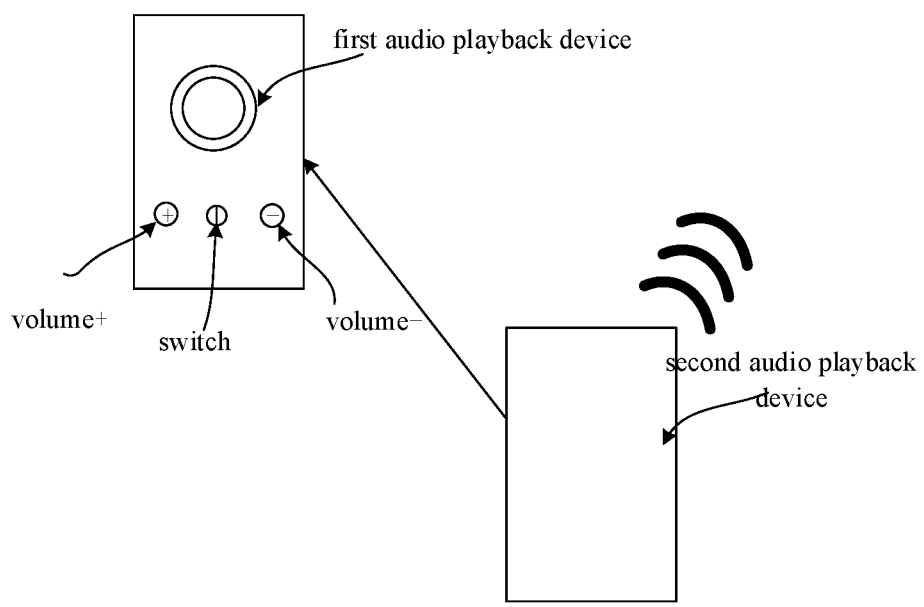
FIG. 4 is a schematic diagram illustrating another audio playback device switching process of an audio playback control method according to some embodiments.

In some embodiments of the present disclosure, based on the above embodiment, after the media content currently played by the terminal is switched to the first audio playback device, the first audio playback device continues to play the audio of the media content currently played by the terminal. The second audio playback device is in close contact with the first audio playback device based on the communicable distance, and the terminal detects that the media content of the terminal currently played by the first audio playback device is switched to the second audio playback device through near field communication to continue to relay playback, the audio of the media content of the terminal is sent to the second audio playback device, and the first audio playback device pauses playing the audio of the media content currently played by the terminal. FIG. 4 is a schematic diagram illustrating an audio playback device switching process of an audio playback control method according to some embodiments. As shown in FIG. 4, the second audio device is triggered to play the audio of the media content currently played by the terminal, for example, the distance between the second audio playback device and the first audio playback device reaches the communicable distance for near field communication, and the second audio playback device continues to relay and play the media content of the terminal. It should be understood that the second audio playback device involved in the embodiment of the present disclosure may be the terminal itself, or may be a smart home appliance such as a speaker, and a TV.

Based on the audio playback control method in the above embodiment, different audio playback devices can be used to play terminal media content through near field communication. Further, a free switch of different audio playback devices can be realized, and the switching steps are simple to operate and the response is fast.

The following embodiments of the present disclosure will describe some embodiments in which the second audio device is a terminal.

In some embodiments of the present disclosure, if the second audio playback device is a terminal, and the terminal is in close contact with the first audio playback device based on the preset communicable distance, it can be realized that the media content currently played by the first audio playback device is switched to the terminal to continue to play the media content. The terminal may be a terminal that realizes close contact with the first audio playback device for the first time, and is referred to as a first terminal for ease of description in the disclosure. It may also be a terminal that is different from the terminal that realizes close contact with the first audio playback device for the first time, and is referred to as a second terminal for ease of description in the disclosure.

Figure 5:
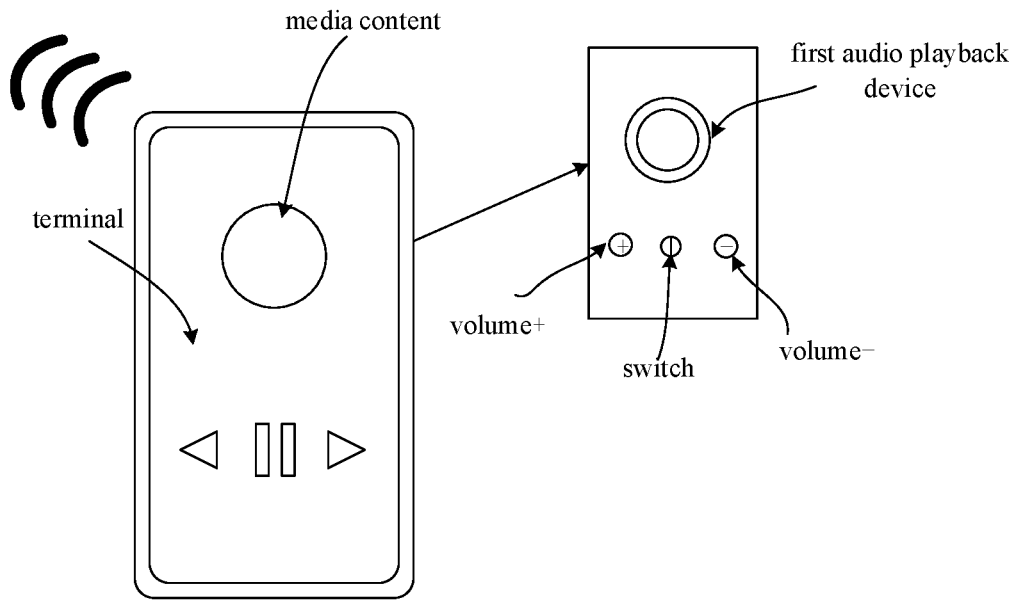
FIG. 5 is a schematic diagram illustrating another audio playback device switching process of an audio playback control method according to some embodiments.

In some embodiments, if the second audio playback device is the first terminal, the first terminal controls the first audio playback device to pause playing the media content currently played, and the first terminal continues to play the current media content. FIG. 5 is a schematic diagram illustrating a switch of an audio playback device of an audio playback control method according to some embodiments. As shown in FIG. 5, the media content of the first audio playback device is switched to the first terminal that stores the media content, and the first terminal continues to play the audio.

In some embodiments, if the second audio playback device is the second terminal, the second audio playback device is in close contact with the first terminal or the first audio device based on the communicable distance for near field communication. The first terminal controls switching the media content of the first audio playback device to the second terminal, the first audio playback device pauses playing the media content, and the first terminal sends the media content currently played to the second terminal. The second terminal continues to relay and play the media content of the first terminal.

In some embodiments of the present disclosure, the second audio playback device may also be another audio playback device different from the terminal and the first audio playback device.

When the second audio playback device that communicates with the first audio playback device in short distance is another audio playback device different from the terminal and the first audio playback device, and the second audio playback device is in close contact with the terminal or the first audio device based on the communicable distance for near field communication, the terminal controls the first audio playback device that plays the terminal media content to switch to the second audio playback device, and the media content played by the terminal is sent to the second audio playback device. When the second audio playback device receives the media content sent by the terminal, it plays the media content currently received. Herein, when the terminal sends the media content to the second audio device, the media content can be sent based on wireless communication transmission methods such as Bluetooth, Wi-Fi and the like.

In some embodiments of the present disclosure, the switching control method for switching the media content played by the first audio playback device to the second audio playback device may include the following implementations.

Figure 6:
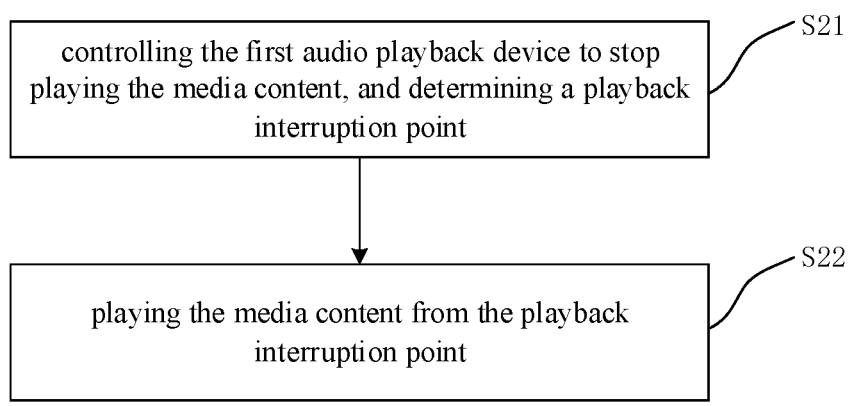
FIG. 6 is a flowchart illustrating another audio playback control method according to some embodiments.

FIG. 6 is a flowchart illustrating an audio playback control method according to some embodiments. As shown in FIG. 6, the switching the audio of the media content played by the first audio playback device to the second audio playback device for playback includes steps S21-S22.

In step S21, the first audio playback device is controlled to stop playing the media content, and a playback interruption point is determined.

In some embodiments of the present disclosure, when switching the media content played by the first audio playback device to the second audio playback device, firstly, the second audio playback device that is switched to play the media content is determined, and the first audio playback device is controlled to pause playing the media content.

Secondly, the playback interruption point at which the first audio playback device pauses playing the media content is determined.

In step S22, the media content is played from the playback interruption point.

In some embodiments of the present disclosure, based on the playback interruption point determined in the above embodiment, the playback interruption point of the media content is used as the playback starting point of the second audio playback device, and the second audio playback device relays and plays the media content.

In some embodiments of the present disclosure, for the case that the distance between the terminal and the another audio playback device different from the first audio playback device reaches the communicable distance for near field communication, and under the condition that the terminal can only realize the near field communication with one audio playback device, the switching control method for switching the media content played by the first audio playback device to the second audio playback device may include the following implementations.

Figure 7:
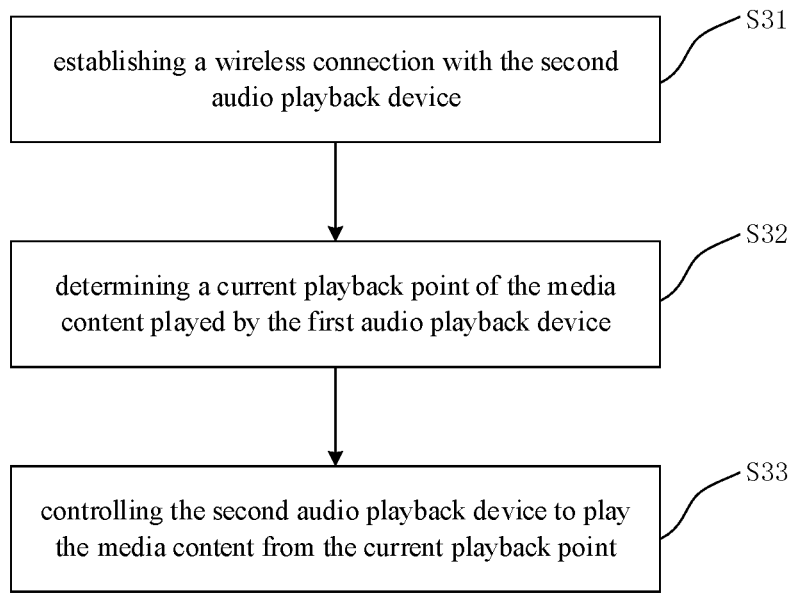
FIG. 7 is a flowchart illustrating another audio playback control method according to some embodiments.

FIG. 7 is a flowchart illustrating an audio playback control method according to some embodiments. As shown in FIG. 7, the switching the audio of the media content played on the first audio playback device to the second audio playback device for playback includes steps S31-S33.

In step S31, a wireless connection is established with the second audio playback device.

In some embodiments of the present disclosure, the terminal realizes close contact with the second audio playback device based on the communicable distance for near field communication. The terminal disconnects the wireless connection with the first audio playback device by itself, and establishes a wireless connection with the second audio playback device. Wherein, the wireless connection between the terminal and the first audio playback device and/or the second audio playback device may be Wi-Fi, Bluetooth, or the like.

In step S32, a current playback point of the media content played by the first audio playback device is determined.

In some embodiments of the present disclosure, when the terminal disconnects the wireless connection with the first audio playback device by itself, the media content played by the first audio device is paused, and the current playback point at which the first audio playback device pauses playing the media content is determined.

In step S33, the second audio playback device is controlled to play the media content from the current playback point.

In some embodiments of the present disclosure, after the terminal establishes a wireless connection with the second audio playback device, the media content is sent to the second audio playback device, and the second audio playback device is controlled to play the media content of the terminal from the determined current playback point.

In some embodiments of the present disclosure, for the case that the distance between the first audio playback device and the another audio playback device reaches the communicable distance for near field communication, the switching control method for switching the media content played by the first audio playback device to the second audio playback device may include the following implementations.

Figure 8:
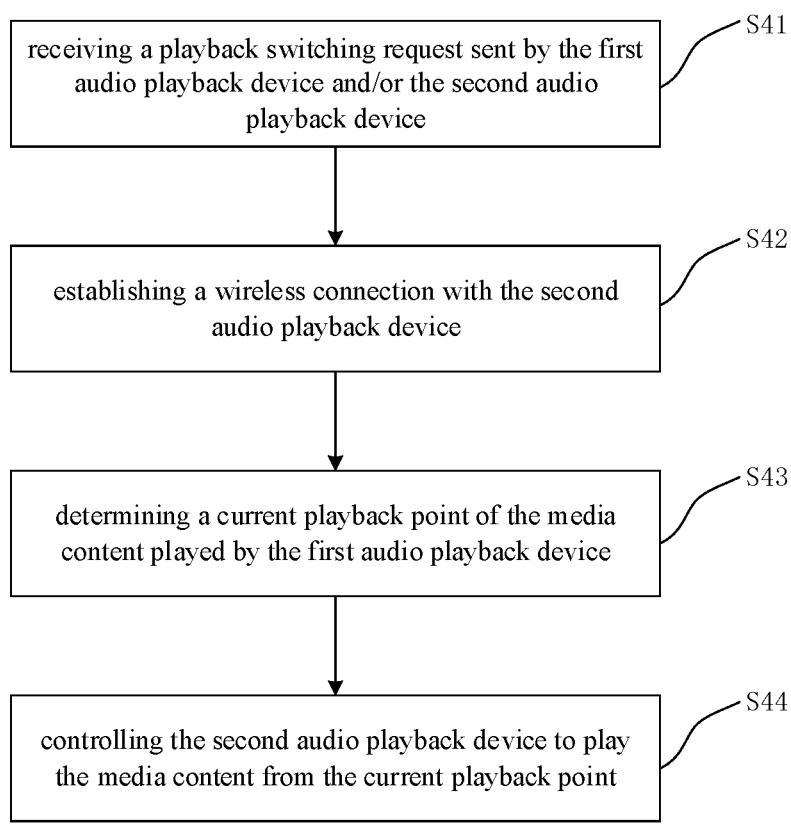
FIG. 8 is a flowchart illustrating another audio playback control method according to some embodiments.

FIG. 8 is a flowchart illustrating an audio playback control method according to some embodiments. As shown in FIG. 8, the switching the audio of the media content played on the first audio playback device to the second audio playback device for playback includes steps S41-S44.

In step S41, a playback switching request sent by the first audio playback device and/or the second audio playback device is received.

In step S42, a wireless connection is established with the second audio playback device.

In step S43, a current playback point of the media content played by the first audio playback device is determined.

In step S44, the second audio playback device is controlled to play the media content from the current playback point.

In some embodiments of the present disclosure, the another audio playback device is referred to as a second audio playback device.

When the distance between the first audio device and the second audio playback device reaches the communicable distance for near field communication, and the first audio playback device and the second audio playback device realize the near field communication, the first audio playback device and/or the second audio playback device send a playback switching request. The terminal detects and receives the playback switching request sent by the first audio playback device and/or the second audio playback device. The terminal responds to the playback switching request sent by the first audio playback device and/or the second audio playback device, and establishes a wireless connection with the second audio playback device. The terminal sends a playback pause instruction to the first audio playback device, controls the first audio playback device to pause playing the media content, and determines the current playback point of the media content played by the first audio playback device. Further, the terminal sends a playback instruction to the second audio playback device, and controls the second audio playback device to play the media content from the current playback point.

In some embodiments of the present disclosure, some embodiments in which the terminal sends a playback pause instruction to the first audio playback device to control the first audio playback device to stop playing the media content can be used, and some embodiments in which the wireless connection with the first audio playback device is disconnected, and the first audio playback device is further controlled to stop playing the media content can be used. Herein, the wireless connection is used for the terminal and the first audio playback device to transmit the media content.

In some embodiments of the present disclosure, for the case that the second audio playback device is another audio playback device different from the terminal and the first audio playback device, the terminal has detected that the distance between the second audio playback device and the terminal is less than the distance between the first audio playback device and the terminal, and it is determined that the audio playback device that plays the terminal media content is switched from the first audio playback device to the second audio playback device.

Based on the similar concept, the embodiments of the present disclosure also provide an audio playback control method.

Figure 9:
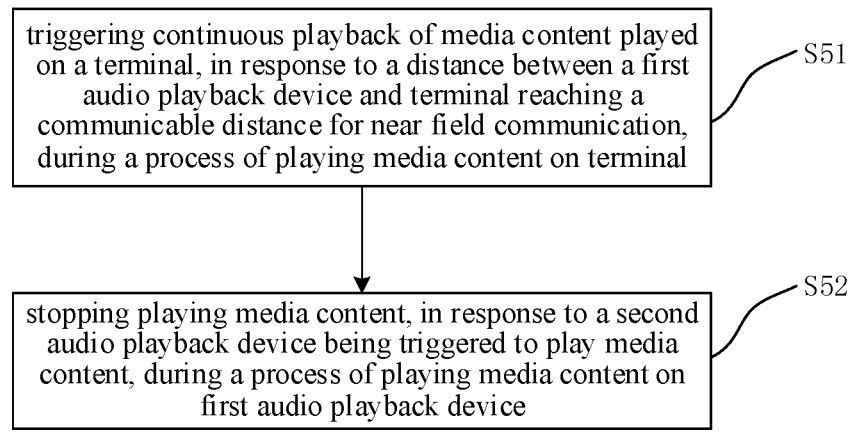
FIG. 9 is a flowchart illustrating another audio playback control method according to some embodiments.

FIG. 9 is a flowchart illustrating an audio playback control method according to some embodiments. As shown in FIG. 9, the audio playback control method is used in the first audio playback device and includes the following steps.

In step S51, continuous playback of media content played on a terminal is triggered in response to a distance between a first audio playback device and the terminal reaching a communicable distance for near field communication during a process of playing the media content on the terminal.

In some embodiments of the present disclosure, during the process of playing the media content on the terminal, if the distance between the first audio playback device and the terminal reaches the communicable distance for near field communication, the first audio playback device detects and receives the playback instruction sent by the terminal. The first audio playback device triggers a playback operation in response to the playback instruction sent by the terminal, and continues to play the media content played on the terminal.

In step S52, the playback of the media content is stopped in response to a second audio playback device being triggered to play the media content during a process of playing the media content on the first audio playback device.

In some embodiments of the present disclosure, during the process of playing the media content on the first audio playback device, when the second audio playback device is in close contact with the terminal and/or the first audio playback device, and detects the near field wireless communication signal of the terminal and/or the first audio playback device based on the near field communication functions such as NFC or UWB, the operation of switching the playback device is triggered, and the playback pause instruction is issued. Alternatively, by receiving the playback pause instruction sent by the terminal, the playback of the media content is paused.

Various embodiments of the present disclosure will further describe some embodiments in which the playback of the media content is stopped in response to the second audio playback device being triggered to play the media content during the process of playing the media content on the first audio playback device.

In some embodiments of the present disclosure, when the distance between the second audio playback device and the terminal and/or the first audio playback device reaches the communicable distance for near field communication, the wireless communication connection is triggered to realize the wireless connection between the terminal and the second audio playback device, and the first audio playback device responds to the playback pause instruction to pause playing the media content. Herein, the second audio playback device may be a terminal, or may be an audio playback device.

When the distance between the second audio playback device and the terminal and/or the first audio playback device reaches the communicable distance for near field communication, and the second audio playback device is another audio playback device different from the terminal and the first audio playback device, the first terminal sends a playback switching request to the terminal when receiving the playback pause instruction. The terminal controls the second audio playback device to relay and play the media content of the terminal, which further realizes the effect that the audio playback device that plays the media content is switched from the first audio playback device to the second audio playback device.

Based on the similar concept, the embodiments of the present disclosure further provide an audio playback control method. The audio playback control method in the embodiment is applied to the second audio playback device.

In some embodiments of the present disclosure, when the distance between the second audio playback device and the terminal reaches the communicable distance for near field communication or the distance between the second audio playback device and the first audio playback device reaches the communicable distance for near field communication, the playback instruction is triggered. The second audio playback device receives the media content of the terminal in response to the triggered playback instruction. Based on the playback interruption point of the media content played by the first audio device, the second audio playback device continues to relay the media content played by the first audio playback device.

Based on the similar concept, the embodiments of the present disclosure also provide an audio playback control apparatus.

It can be understood that, in order to implement the above functions, the audio playback control apparatus provided by the embodiments of the present disclosure includes a corresponding hardware structure and/or software module for executing each function. In combination with the units and algorithm steps of the respective examples disclosed in some embodiments of the present disclosure, the embodiments of the present disclosure can be implemented in the form of hardware or a combination of hardware and computer software. Whether a function is executed by the hardware or a method of driving the hardware by the computer software depends on the specific application and design constraints of the technical solution. A person skilled in the art may use different methods to implement the described functions for each specific application, but such implementation should not be considered to exceed the scope of the technical solutions of the embodiments of the present disclosure.

Figure 10:
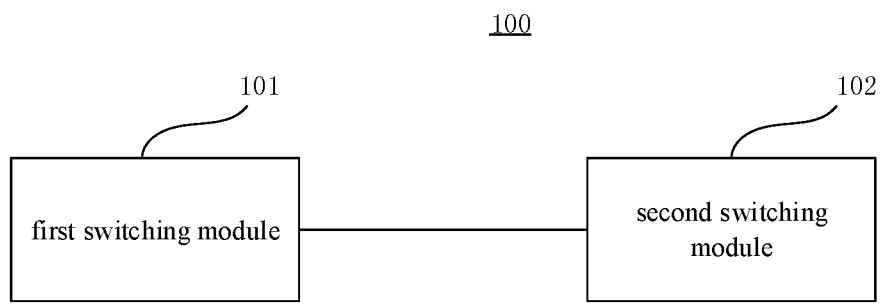
FIG. 10 is a block diagram illustrating an audio playback control apparatus according to some embodiments.

FIG. 10 is a block diagram illustrating an audio playback control apparatus 100 according to some embodiments. Referring to FIG. 10, the audio playback control device 100 includes a first switching module 101 and a second switching module 102.

The first switching module 101 is configured to switch audio of media content played on a terminal to a first audio playback device for playback by triggering in response to a distance between the terminal and the first audio playback device reaching a communicable distance for near field communication during a process of playing the media content on the terminal. The second switching module 102 is configured to switch the audio of the media content played on the first audio playback device to a second audio playback device for playback in response to the second audio playback device being triggered to play the media content during a process of playing the media content on the first audio playback device.

In some embodiments of the present disclosure, the second audio playback device is the terminal. The second audio playback device being triggered to play the media content includes: the distance between the terminal and the first audio playback device reaching the communicable distance for near field communication.

In some embodiments of the present disclosure, the second audio playback device is another audio playback device different from the terminal and the first audio playback device. The second audio playback device being triggered to play the media content includes: a distance between the terminal and/or the first audio playback device and the another audio playback device reaching the communicable distance for near field communication.

In some embodiments of the present disclosure, the second switching module 102 is configured to control the first audio playback device to stop playing the media content, and determine a playback interruption point. The media content is played from the playback interruption point.

In some embodiments of the present disclosure, for the case that the distance between the terminal and the another audio playback device reaches the communicable distance for near field communication, the second switching module 102 is configured to establish a wireless connection with the second audio playback device; determine a current playback point of the media content played by the first audio playback device; and control the second audio playback device to play the media content from the current playback point.

In some embodiments of the present disclosure, for the case that the distance between the first audio device and the another audio playback device reaches the communicable distance for near field communication, the second switching module 102 is configured to receive a playback switching request sent by the first audio playback device and/or the second audio playback device; establish a wireless connection with the second audio playback device; determine a current playback point of the media content played by the first audio playback device; and control the second audio playback device to play the media content from the current playback point.

In some embodiments of the present disclosure, the first switching module 101 is further configured to control the first audio playback device to stop playing the media content; and/or disconnect the wireless connection with the first audio playback device. Herein, the wireless connection is used to transmit the media content with the first audio playback device.

In some embodiments of the present disclosure, the second audio playback device is another audio playback device different from the terminal and the first audio playback device. The second audio playback device being triggered to play the media content includes: a distance between the second audio playback device and terminal being less than the distance between the first audio playback device and the terminal.

Based on the similar concept, the embodiments of the present disclosure also provide an audio playback control apparatus.

Figure 11:
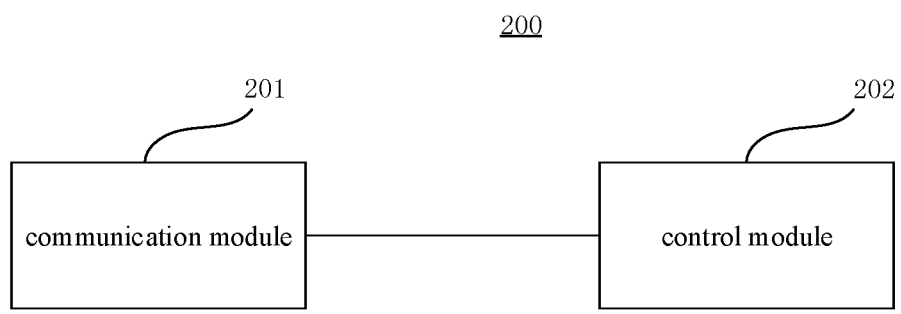
FIG. 11 is a block diagram illustrating another audio playback control apparatus according to some embodiments.

FIG. 11 is a block diagram illustrating an audio playback control apparatus 200 according to some embodiments. Referring to FIG. 11, the audio playback control apparatus 200 includes a communication module 201 and a control module 202.

The communication module 201 is configured to trigger continuous playback of media content played on the terminal in response to a distance between a first audio playback device and a terminal reaching a communicable distance for near field communication during a process of playing the media content on the terminal. The control module 202 is configured to stop playing the media content in response to a second audio playback device being triggered to play the media content during a process of playing the media content on the first audio playback device.

In some embodiments of the present disclosure, the control module 202 is configured to stop playing the media content in response to a distance between the first audio playback device and the second audio playback device reaching the communicable distance for near field communication during the process of playing the media content on the first audio playback device.

In some embodiments of the present disclosure, the communication module 201 is further configured to send a playback switching request to the terminal.

Based on the similar concept, the embodiments of the present disclosure also provide an audio playback control apparatus.

Figure 12:
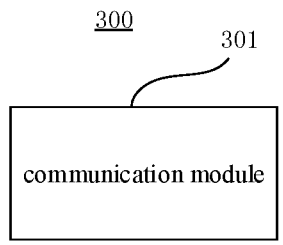
FIG. 12 is a block diagram illustrating another audio playback control apparatus according to some embodiments.

FIG. 12 is a block diagram illustrating an audio playback control apparatus 300 according to some embodiments. Referring to FIG. 12, the audio playback control apparatus 300 includes a communication module 301. The communication module 301 is configured to trigger continuous playback of media content played on a first audio playback device in response to a distance between a second audio playback device and a terminal reaching a communicable distance for near field communication or a distance between the second audio playback device and the first audio playback device reaching the communicable distance for near field communication during a process of playing the media content on the first audio playback device.

With respect to the apparatuses in the above embodiments, the specific manners for performing operations for individual modules therein have been described in detail in the embodiments regarding the methods, which will not be elaborated herein.

Figure 13:
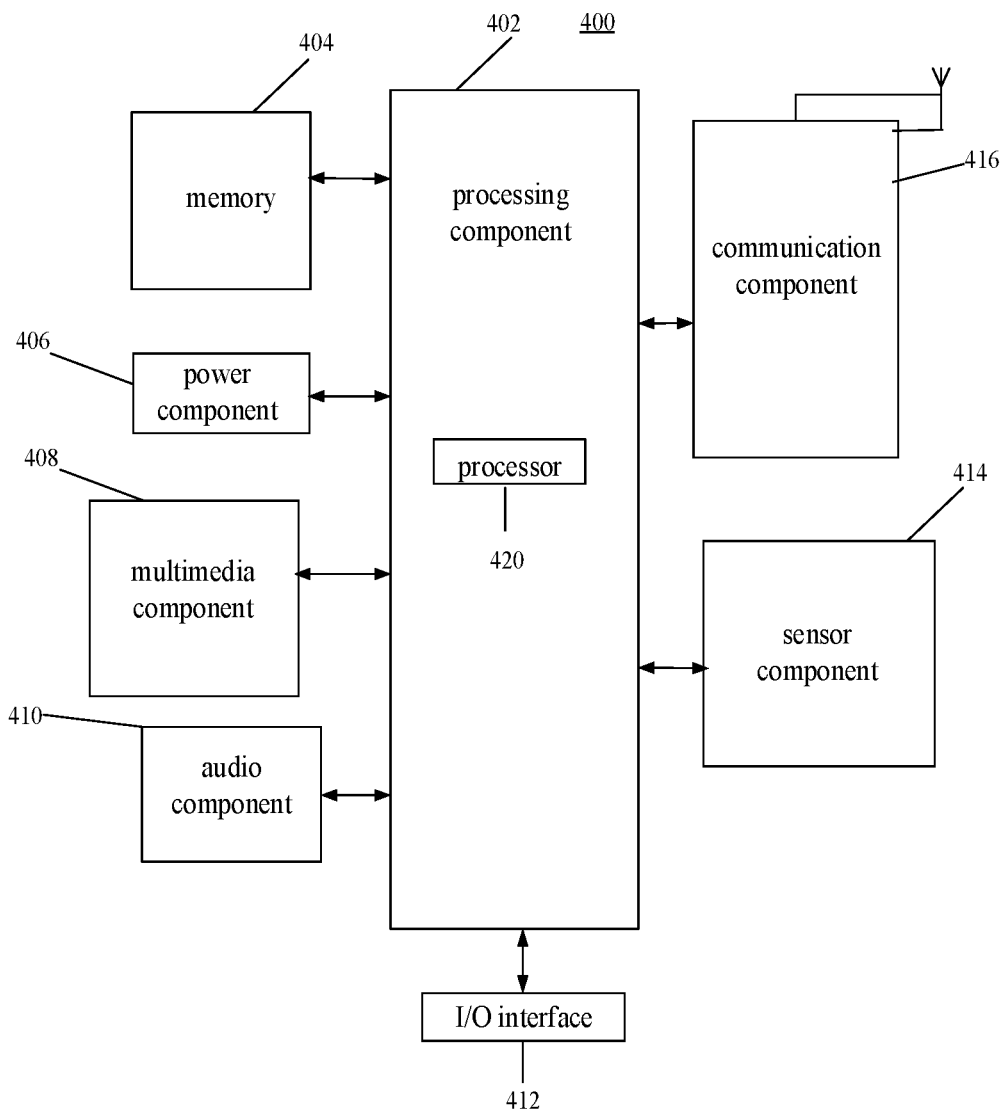
FIG. 13 is a block diagram illustrating a device for audio playback control according to some embodiments.

FIG. 13 is a block diagram illustrating a device 400 for audio playback control according to some embodiments. For example, the device 400 can be a mobile phone, a computer, a digital broadcast terminal, a messaging device, a gaming console, a tablet device, a medical device, exercise equipment, a personal digital assistant, and the like.

Referring to FIG. 13, the device 400 may include one or more of the following components: a processing component 402, a memory 404, a power component 406, a multimedia component 408, an audio component 410, an input/output (I/O) interface 412, a sensor component 414, and a communication component 416.

The processing component 402 typically controls overall operations of the device 400, such as the operations associated with display, telephone calls, data communications, camera operations, and recording operations. The processing component 402 may include one or more processors 420 to execute instructions to implement all or part of the steps in the above described methods. Moreover, the processing component 402 may include one or more modules which facilitate the interaction between the processing component 402 and other components. For instance, the processing component 402 may include a multimedia module to facilitate the interaction between the multimedia component 408 and the processing component 402.

The memory 404 is configured to store various types of data to support the operation of the device 400. Examples of such data include instructions for any applications or methods operated on the device 400, contact data, phonebook data, messages, pictures, videos, etc. The memory 404 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 406 supplies power to various components of the device 400. The power component 406 may include a power management system, one or more power sources, and other components associated with the generation, management, and distribution of power in the device 400.

The multimedia component 408 includes a screen providing an output interface between the device 400 and a user. In some embodiments, the screen may include a liquid crystal display (LCD) and a touch panel (TP). In some implementations, an organic light-emitting diode (OLED) display can be employed.

If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some embodiments, the multimedia component 408 includes a front camera and/or a rear camera. The front camera and/or the rear camera can receive external multimedia data while the device 400 is in an operation mode, such as a photographing mode or a video mode. Each of the front camera and the rear camera may be a fixed optical lens system or have focus and optical zoom capability.

The audio component 410 is configured to output and/or input audio signals. For example, the audio component 410 includes a microphone (MIC) configured to receive an external audio signal when the device 400 is in an operation mode, such as a call mode, a recording mode, and a voice recognition mode. The received audio signal can be further stored in the memory 404 or transmitted via the communication component 416. In some embodiments, the audio component 410 further includes a speaker to output audio signals.

The I/O interface 412 provides an interface between the processing component 402 and peripheral interface modules, such as a keyboard, a click wheel, buttons, and the like. The buttons may include, but are not limited to, a home button, a volume button, a starting button, and a locking button.

The sensor component 414 includes one or more sensors to provide status assessments of various aspects of the device 400. For instance, the sensor component 414 can detect an on/off status of the device 400, relative positioning of components, e.g., the display and a keypad, of the device 400, the sensor component 414 can also detect a change in position of the device 400 or one component of the device 400, a presence or absence of user contact with the device 400, an orientation or an acceleration/deceleration of the device 400, and a change in temperature of the device 400. The sensor component 414 may include a proximity sensor configured to detect the presence of nearby objects without any physical contact. The sensor component 414 may also include a light sensor, such as a CMOS or CCD image sensor, for use in imaging applications. In some embodiments, the sensor component 414 can also include an accelerometer sensor, a gyroscope sensor, a magnetic sensor, a pressure sensor, or a temperature sensor.

The communication component 416 is configured to facilitate wired or wireless communication between the device 400 and other devices. The device 400 can access a wireless network based on a communication standard, such as Wi-Fi, 2G, 3G, 4G, 5G or a combination thereof. In some embodiments, the communication component 416 receives a broadcast signal or broadcast associated information from an external broadcast management system via a broadcast channel. In some embodiments, the communication component 416 further includes a near field communication (NFC) module to facilitate near field communications. For example, the NFC module can be implemented based on a radio frequency identification (RFID) technology, an infrared data association (IrDA) technology, an ultra-wideband (UWB) technology, a Bluetooth (BT) technology, and other technologies.

In some embodiments, the device 400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer-readable storage medium including instructions, such as the memory 404 including the instructions executable by the processor 420 in the device 400, for completing the above described methods. For example, the non-transitory computer-readable storage medium can be a ROM, a random-access memory (RAM), a CD-ROM, a magnetic tape, a floppy disc, an optical data storage device, and the like.

Various embodiments of the present disclosure can have one or more of the following advantages.

Through the near field communication technologies, when the terminal and the first audio playback device are in "close contact," e.g., within a distance of near-field communications, it can be realized that the first audio playback device relays the media content of the terminal. When the second audio playback device is in "close contact" with the first audio playback device and/or the terminal, the second audio playback device can relay and play the media content of the terminal, such that free switching between multiple audio playback devices can be realized, and the operation can be very simple.

A smart home system implementing the audio playback control method can therefore be realized, including a plurality of devices such as the first audio playback device and the second audio playback device, wherein the first audio playback device and the second audio playback device are configured to realize relaying and playing the media content of the terminal based on proximity to the terminal.

The smart home system can realize automatic switching playing the media content of the terminal to one of a plurality of audio playback devices that is nearest to the terminal continuously, while stopping playing the media content of the terminal on other of the plurality of audio playback devices, achieving uninterrupted media content playing for a user when the user moves about in the house, for example from one room to another, where different audio playback devices are located. In another example, when the user moves from a car to the home or to an office, the media content playing can be automatically switched to a speaker or a TV in the home or the office, from the car audio.

The various device components, units, circuits, blocks, or portions may have modular configurations, or are composed of discrete components, but nonetheless may be referred to as "modules," "components" or "circuits" in general. In other words, the components, units, circuits, blocks, or portions referred to herein may or may not be in modular forms.

The various device components, units, blocks, portions, or modules may be realized with hardware, software, or a combination of hardware and software.

In some embodiments of the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in some embodiments of the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In some embodiments of the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or retracted from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "l" generally indicates that the contextual objects are in an "or" relationship.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

What is claimed is:

1. An audio playback control method, applied to a terminal, comprising:
    triggering switching an audio of media content played on the terminal to a first audio playback device for playback, in response to a distance between the terminal and the first audio playback device reaching a communicable distance for near field communication, during a process of playing the media content on the terminal; and
    switching the audio of the media content played on the first audio playback device to a second audio playback device for playback, in response to the second audio playback device being triggered to play the media content, during a process of playing the media content on the first audio playback device, without user operations on the terminal,
    wherein the second audio playback device being triggered to play the media content comprises:
    the distance between the second audio playback device and the first audio playback device reaching the communicable distance for near field communication, and
    wherein the first audio playback device is an audio playback device in the communicable distance for near field communication with the terminal, and the second audio playback device is an audio playback device in the communicable distance for near field communication with the first audio playback device to implement audio relay playback between the terminal and the first audio playback device, and between the first audio playback device and the second audio playback device.

2. The audio playback control method according to claim 1, wherein the second audio playback device is another audio playback device different from the terminal and the first audio playback device; and
    the second audio playback device being triggered to play the media content comprises:
    a distance between the another audio playback device and one of the terminal and the first audio playback device reaching the communicable distance for near field communication.

3. The audio playback control method according to claim 1, wherein the switching the audio of the media content played on the first audio playback device to the second audio playback device for playback comprises:
    controlling the first audio playback device to stop playing the media content, and determining a playback interruption point; and
    playing the media content from the playback interruption point.

4. The audio playback control method according to claim 2, wherein for the case that the distance between the terminal and the another audio playback device reaches the communicable distance for near field communication, the switching the audio of the media content played on the first audio playback device to the second audio playback device for playback comprises:
    establishing a wireless connection with the second audio playback device;
    determining a current playback point of the media content played by the first audio playback device; and
    controlling the second audio playback device to play the media content from the current playback point.

5. The audio playback control method according to claim 2, wherein for the case that the distance between the first audio playback device and the another audio playback device reaches the communicable distance for near field communication, the switching the audio of the media content played on the first audio playback device to the second audio playback device for playback comprises:
    receiving a playback switching request sent by one of the first audio playback device and the second audio playback device;
    establishing a wireless connection with the second audio playback device;
    determining a current playback point of the media content played by the first audio playback device; and
    controlling the second audio playback device to play the media content from the current playback point.

6. The audio playback control method according to claim 4, wherein the method further comprises at least one of the following operations:
    controlling the first audio playback device to stop playing the media content by the first audio playback device by controlling the first audio playback device; and
    disconnecting the wireless connection with the first audio playback device, wherein the wireless connection is used to transmit the media content with the first audio playback device.

7. The audio playback control method according to claim 1, wherein the second audio playback device is another audio playback device different from the terminal and the first audio playback device; and
    the second audio playback device being triggered to play the media content comprises:
    a distance between the second audio playback device and the terminal being less than the distance between the first audio playback device and the terminal.

8. An audio playback control method, applied to a first audio playback device, wherein the audio playback control method comprises:
- playing continuously media content played on a terminal, which is triggered in response to a distance between the first audio playback device and the terminal reaching a communicable distance for near field communication, during a process of playing the media content on the terminal, without user operations on the terminal; and
- stopping playing the media content, in response to a second audio playback device being triggered to play the media content, during a process of playing the media content on the first audio playback device,
- wherein the first audio playback device is an audio playback device in the communicable distance for near field communication with the terminal, and the second audio playback device is an audio playback device in the communicable distance for near field communication with the first audio playback device to implement audio relay playback between the terminal and the first audio playback device, and between the first audio playback device and the second audio playback device.

9. The audio playback control method according to claim 8, wherein the stopping playing the media content, in response to the second audio playback device being triggered to play the media content, during the process of playing the media content on the first audio playback device comprises:
- stopping playing the media content, in response to a distance between the first audio playback device and the second audio playback device reaching the communicable distance for near field communication, during the process of playing the media content on the first audio playback device.

10. The audio playback control method according to claim 9, wherein in response to the second audio playback device being another audio playback device different from the terminal and the first audio playback device, the method further comprises:
- sending a playback switching request to the terminal.

11. An audio playback control method, applied to a second audio playback device, wherein the audio playback control method comprises:
- playing continuously media content played on a first audio playback device, which is triggered in response to a distance between the second audio playback device and a terminal reaching a communicable distance for near field communication or distance between the second audio playback device and the first audio playback device reaching the communicable distance for near field communication, during a process of playing the media content on the first audio playback device, without user operations on the terminal,
- wherein the first audio playback device is an audio playback device in the communicable distance for near field communication with the terminal, and the second audio playback device is an audio playback device in the communicable distance for near field communication with the first audio playback device to implement audio relay playback between the terminal and the first audio playback device, and between the first audio playback device and the second audio playback device.

12. An audio playback control apparatus implementing the audio playback control method according to claim 1, comprising:
- memory for storing processor-executable instructions; and
- a processor configured to execute the instructions to perform operations of the audio playback control method.

13. An audio playback control apparatus implementing the audio playback control method according to claim 8, comprising:
- memory for storing processor-executable instructions; and
- a processor configured to execute the instructions to perform operations of the audio playback control method.

14. An audio playback control apparatus implementing the audio playback control method according to claim 11, comprising:
- memory for storing processor-executable instructions; and
- a processor configured to execute the instructions to perform operations of the audio playback control method.

15. A non-transitory computer-readable storage medium, wherein when instructions in the storage medium are executed by a processor of a mobile terminal, the mobile terminal is enabled to execute the audio playback control method according to claim 1.

16. A non-transitory computer-readable storage medium, wherein when instructions in the storage medium are executed by a processor of a mobile terminal, the mobile terminal is enabled to execute the audio playback control method according to claim 8.

17. A non-transitory computer-readable storage medium, wherein when instructions in the storage medium are executed by a processor of a mobile terminal, the mobile terminal is enabled to execute the audio playback control method according to claim 11.

18. A smart home system implementing the audio playback control method according to claim 1, comprising the first audio playback device and the second audio playback device, wherein the first audio playback device and the second audio playback device are configured to realize relaying and playing the media content of the terminal based on proximity to the terminal.

19. The smart home system according to claim 18, wherein the smart home system is configured to automatically switch playing the media content of the terminal to one of a plurality of audio playback devices that is nearest to the terminal continuously, while stopping playing the media content of the terminal on other of the plurality of audio playback devices.

* * * * *